L. POH.
Beer-Faucets.
No. 6,017. Reissued Aug. 18, 1874.
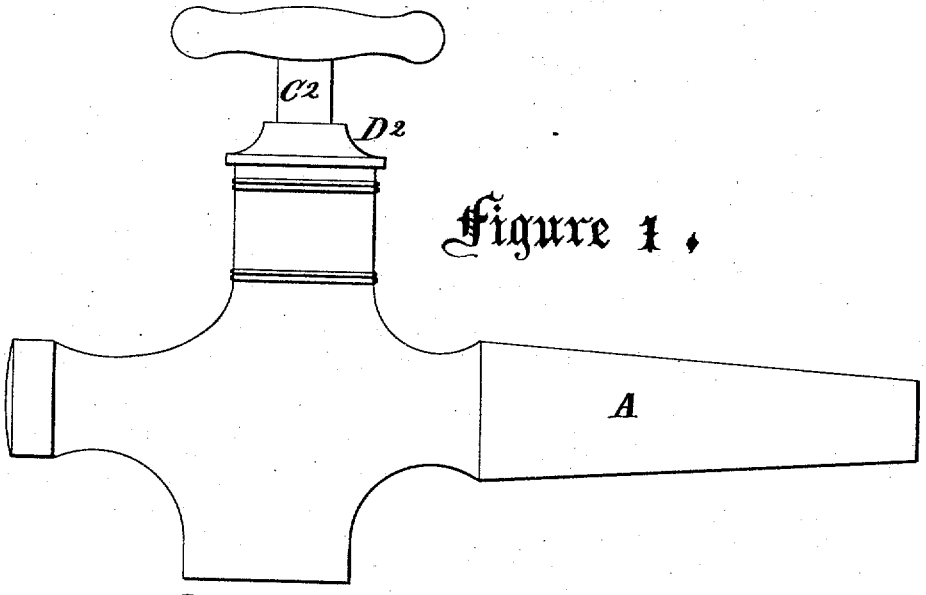
Figure 1,
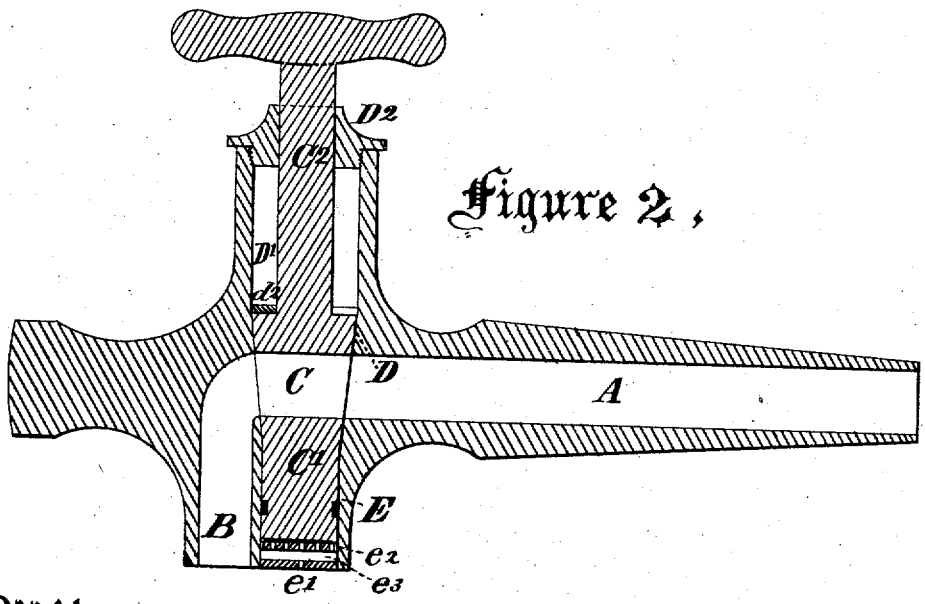
Figure 2,
Witnesses.
Amos W. Sangster,
A. N. Samuels.
Inventor,
Louis Poh,
By James Sangster,
Attorney.
THE GRAPHIC CO. PHOTO-LITH. 39 & 41 PARK PLACE, N.Y.

UNITED STATES PATENT OFFICE.

LOUIS POH, OF BUFFALO, NEW YORK, ASSIGNOR OF ONE-HALF INTEREST TO CHARLES RAICHLE, OF SAME PLACE.

IMPROVEMENT IN BEER-FAUCETS.

Specification forming part of Letters Patent No. 48,588, dated July 4, 1865; reissue No. 6,017, dated August 18, 1874; application filed June 8, 1874.

*To all whom it may concern:*

Be it known that I, LOUIS POH, of the city of Buffalo, in the county of Erie and State of New York, have invented a new and Improved Faucet for Barrels or Casks, of which the following is a specification:

Figure 1 is a side elevation of my improved faucet; Fig. 2, a vertical longitudinal section.

Similar letters of reference indicate corresponding parts.

My invention relates to that class of faucets used for drawing beer or other malt liquors, which have small pumps or ejectors combined therewith for the purpose of restoring the flavor and life to the beer when, from exposure to the air, it has lost the same; and it consists in arranging the tapering or conical key or plug with a plunger or piston extension, so as to work tightly in a barrel below the key seat or socket, and so as to be capable of either a key or plunger movement, so that by turning it as a key the flow of liquor through the outlet or discharge nozzle may be governed the same as in a common faucet, and by raising it as a plunger a free flow through the discharge-nozzle will ensue, and the plunger-barrel become filled by the liquor, which, upon the descent of the plunger, will be ejected with sufficient force through a small hole below the plunger-barrel into the receiving-glass to accomplish the desired result.

A represents the stem of the faucet; B, the discharge-nozzle; C $C^1$, the combined key and plunger. D is the tapering key seat or socket, which extends higher than usual above the bore of the faucet, thereby forming the chamber or barrel $D^1$, to allow for the vertical plunger movement of the key. $D^2$ is a screw cap or cover for the key-socket, through which the stem $C^2$ of the key works. $d^2$ represents a ring or washer of leather, made to fit the chamber $D^1$, and act as a packing to prevent leakage through the cap around the stem. E is the plunger-barrel, in which the plunger $C^1$ works, it being an extension of the key seat or socket below the bore of the faucet-stem A. This barrel is closed at the bottom, having a single small hole or perforation, $e^1$, through which the liquor is ejected by the action of the plunger; but a false bottom, $e^2$, may be placed just above, leaving a small chamber, $e^3$, between. This false bottom is made full of perforations of the same size as $e^1$, and acts as a strainer to prevent the clogging or filling up of the hole $e^1$.

The operation of my invention may be briefly described, as follows: When the faucet is inserted into a full cask of fresh beer or other malt liquor, the use of the ejector is unnecessary, and the faucet may be used in the same manner that any common faucet would be—*i. e.*, opening the flow of the liquor by the simple turning of the key; but, after a quantity has been drawn from the cask, and air allowed to enter through the vent, the liquor will have become flat and insipid to the taste. To remedy this, and restore the flavor, the ejector is put in operation.

The raising of the key or plunger will have the same effect as turning the key to open the faucet and allow the liquor to flow, for the reason that the key being conical, or in part tapering in form, and the plunger of less diameter than the small end of the key, an annular space will be formed between the key and its seat, through which the liquor may flow into the plunger-barrel, which will become filled with the liquor, so that when the flow is shut off by the descent of the plunger the same will be forcibly ejected through the hole $e^1$ in the bottom of the barrel into the glass, and thoroughly agitate the liquor therein, and cause it to foam and resume its proper flavor and life.

I claim as my invention—

1. The combination of the conical turning-key C, key-seat D, piston $C^1$, and a piston or plunger barrel, E, substantially as and for the purposes described.

2. The combination of the key C, plunger $C^1$, plunger-barrel E, and discharge-nozzle B, when arranged and operating substantially as described.

LOUIS POH.

Witnesses:

ROBT. F. SCHELLING,
JAMES SANGSTER.